Patented June 24, 1930

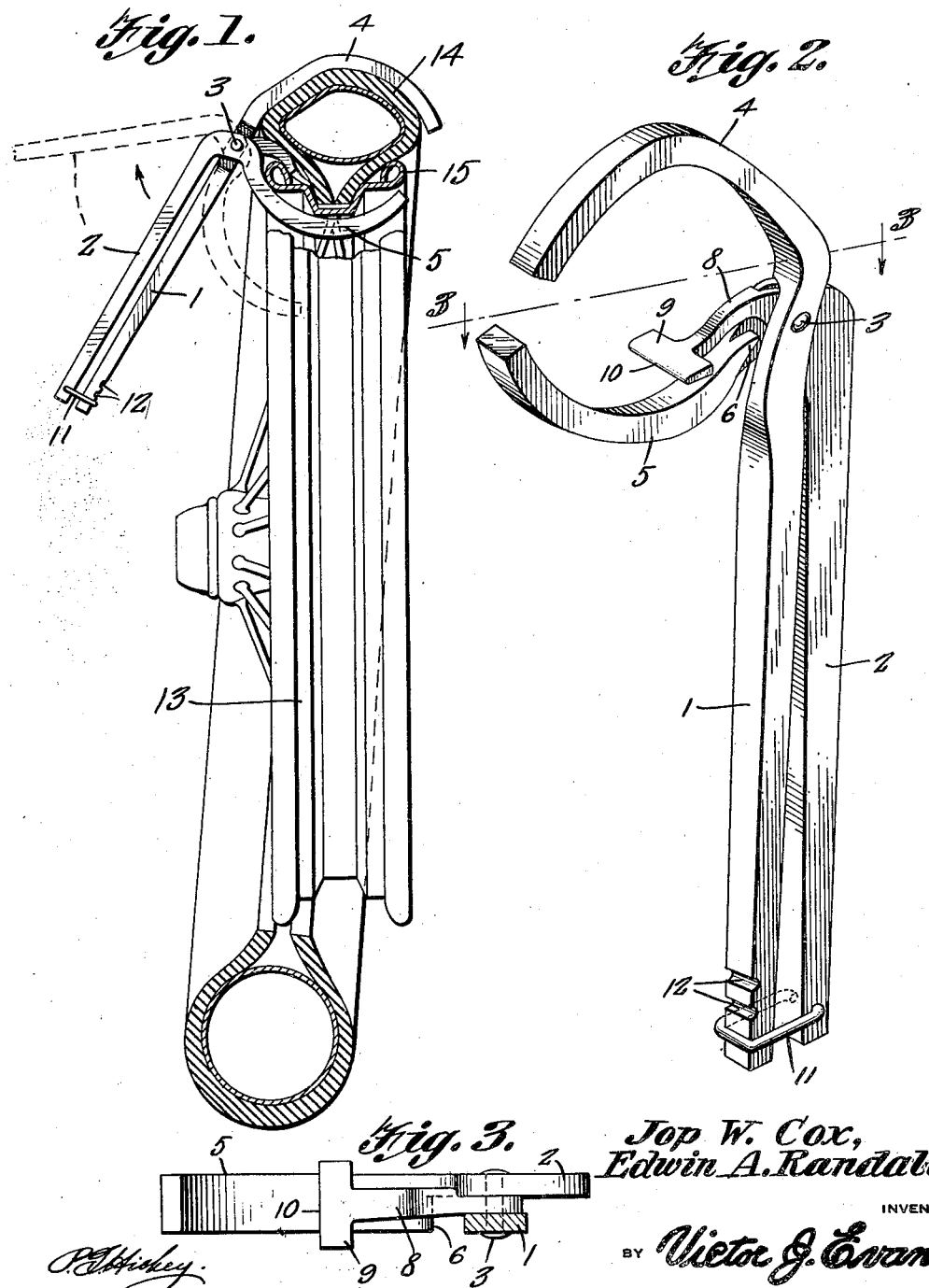

1,768,032

UNITED STATES PATENT OFFICE

JOP W. COX AND EDWIN A. RANDALL, OF HOT SPRINGS, ARKANSAS

TIRE TOOL

Application filed December 13, 1929. Serial No. 413,867.

Our present invention has reference to a tire removing tool for use by mechanics in repair shops or by owners of automobiles, and our object is the provision of a tool for this purpose which shall be of any extremely simple construction and which by a single application thereof will compress a tire and force the same away from the flange of the tire carrying rim so that a defective or punctured tire may be removed from a wheel in an expeditious manner and with the least amount of physical exertion upon the part of the operator.

To the attainment of the foregoing the invention consists in the improvement hereinafter described and definitely claimed.

In the drawings:

Figure 1 is a side elevation of the improvement in operative position, a portion of the tire and the tire carrying rim being in section.

Figure 2 is a perspective view of the tool.

Figure 3 is a sectional view approximately on the line 3—3 of Figure 2.

As disclosed by the drawings, we make use of two handle members 1 and 2, respectively. The handles have reduced lapping portions which are pivotally connected, as at 3. Both of the handles have on their ends, adjacent to the pivot 3, laterally extending oppositely arched jaws 4 and 5, respectively. Both the jaws are of a width approximately equalling that of the handles 1 and 2, and the jaw 5, at its juncture with the offset reduced end of the handle 2, is formed with a laterally extending shoulder 6. The pivot 3 passes through the shank 8 of what I will term a tongue member, the said shank being received between the reduced portions of the handles 1 and 2. The shank is arched in the direction of the jaw 5 and is, of course, arranged between both the jaws 4 and 5. The tongue terminates into a laterally extending head 9 which is wedge-shaped but which has its outer and reduced end rounded, as at 10. There is pivotally secured to the handle 2, adjacent to the end thereof a bail 11, and the outer end of this bail is designed to be received in any one of a plurality of transverse notches 12 in the outer face of the handle 1.

The tire carrying rim of the wheel, in Figure 1 of the drawings, is indicated by the numeral 13 and the tire which is arranged upon the rim is indicated by the numeral 14. The tire, of course, has its side walls engaged by the flanges 15 on the sides of the rim 13.

When a tire becomes punctured or otherwise injured and its removal from the rim is desired the handles are spread to bring the jaw 5 under the rim 13 and the jaw 4 over the tire. Air is, of course, let out of the tire. The jaws are now swung toward each other so that the wedge-shaped head 9 of the tongue 8 will be received between one of the side walls of the tire and one of the flanges 15 of the rim 13. The jaws are latched together by the bail 11. This operation forces the portion of the deflated tire engaged by the jaw 4 and the portion thereof engaged by the head 9 toward each other so that the tire will be compressed to a degree to permit of the same being removed by hand or by the swinging of the tool to the dotted line position disclosed by Figure 1 of the drawings.

It should be stated, and as disclosed by Figure 1 of the drawings our tool is designed for use in connection with tire carrying rims that have their central portions bulged or of the type that is commonly known as the "drop center" rims.

The construction and advantages of my improvement will be apparent to those skilled in the art to which such invention relates so that further detailed description will not be required, it being thought merely necessary to add that we do not wish to be restricted to the precise details herein set forth and, therefore, hold ourselves entitled to make such changes therefrom as fairly fall within the scope of what we claim.

Having described the invention, we claim:—

1. A tire removing tool as herein set forth comprising two handle members which have lapping portions which are pivotally connected and which have laterally extending oppositely directed arched jaws on the said pivoted ends thereof, and a tongue having an arched shank portion which is mounted on the pivot said tongue being of a materially less length than that of the jaws.

2. A tire removing tool as herein set forth, comprising two handle members which have lapping portions which are pivotally connected and which have laterally extending oppositely directed arched jaws on the said pivoted ends thereof, and a tongue having an arched shank portion which is mounted on the pivot and one of the jaws having a shouldered portion to contact with the shank of the tongue, and said tongue and shank being of a materially less length than that of the jaws.

3. A tire removing tool as herein set forth, comprising two handle members which have lapping portions which are pivotally connected and which have laterally extending oppositely directed arched jaws on the said pivoted ends thereof, and a tongue having an arched shank portion which is mounted on the pivot, one of the jaws having a shouldered portion to contact with the shank of the tongue and said tongue having an outer laterally extending wedge-shaped head and said tongue and shank being of a materially less length than that of the jaws.

In testimony whereof we affix our signatures.

JOP W. COX.
EDWIN A. RANDALL.